(12) United States Patent
Reeve et al.

(10) Patent No.: US 11,790,017 B2
(45) Date of Patent: Oct. 17, 2023

(54) SYSTEMS AND METHODS FOR SEARCHING RELATED DOCUMENTS AND ASSOCIATED SEARCH OPERATORS

(71) Applicant: CS Disco, Inc., Austin, TX (US)

(72) Inventors: Brock Joseph Reeve, Cedar Park, TX (US); Matthew Jefferson Hinze, Austin, TX (US); Jordan Travis Janes, Austin, TX (US)

(73) Assignee: CS Disco, Inc., Austin, TX (US)

( * ) Notice: Subject to any disclaimer, the term of this patent is extended or adjusted under 35 U.S.C. 154(b) by 13 days.

(21) Appl. No.: 17/459,941

(22) Filed: Aug. 27, 2021

(65) Prior Publication Data

US 2022/0350844 A1    Nov. 3, 2022

Related U.S. Application Data

(60) Provisional application No. 63/182,144, filed on Apr. 30, 2021.

(51) Int. Cl.

| | |
|---|---|
| *G06F 16/951* | (2019.01) |
| *G06F 16/9538* | (2019.01) |
| *G06F 40/284* | (2020.01) |
| *G06F 16/2455* | (2019.01) |
| *G06F 16/9535* | (2019.01) |

(52) U.S. Cl.
CPC ...... *G06F 16/951* (2019.01); *G06F 16/24554* (2019.01); *G06F 16/9535* (2019.01); *G06F 16/9538* (2019.01); *G06F 40/284* (2020.01)

(58) Field of Classification Search
CPC ............ G06F 16/951; G06F 16/24554; G06F 16/9535; G06F 16/9538; G06F 40/284

USPC .......................................................... 707/706
See application file for complete search history.

(56) References Cited

U.S. PATENT DOCUMENTS

| | | | | |
|---|---|---|---|---|
| 5,778,364 | A   * | 7/1998  | Nelson ..................... | G06F 16/33 |
| | | | | 707/999.005 |
| 8,086,594 | B1    | 12/2011 | Cao | |
| 8,843,488 | B1 * | 9/2014  | Chong ................. | G06F 16/9558 |
| | | | | 707/736 |
| 9,684,496 | B1 * | 6/2017  | Reid ........................ | G06F 8/425 |
| 10,983,995 | B2 * | 4/2021  | Brown ............... | G06F 16/24535 |
| 11,151,103 | B1 * | 10/2021 | Ranade ............... | G06F 16/2228 |
| 2002/0049756 | A1 * | 4/2002  | Chua ..................... | G06F 16/951 |
| 2002/0198874 | A1    | 12/2002 | Nasr | |
| 2006/0010126 | A1    | 1/2006  | Anick | |
| 2007/0185826 | A1 * | 8/2007  | Brice ................... | G06F 16/2423 |
| 2008/0154871 | A1 * | 6/2008  | Leidner ............... | G06F 16/9577 |
| 2008/0281857 | A1    | 11/2008 | Dymetman | |
| 2009/0100039 | A1 * | 4/2009  | Chang ................... | G06F 16/951 |
| | | | | 707/999.005 |

(Continued)

OTHER PUBLICATIONS

International Search Report and the Written Opinion for International Application No. PCT/US21/48886, dated Dec. 6, 2021, 8 pgs.

*Primary Examiner* — Amy Ng
*Assistant Examiner* — Abdullah A Daud
(74) *Attorney, Agent, or Firm* — Sprinkle IP Law Group

(57) ABSTRACT

Embodiments of systems and methods for a search system that is adapted to utilize a family search operator are disclosed. Such a family search operator may return all documents that match the inner expression encompassed by the family search operator or having a family member that matched the inner expression of the family search operator.

15 Claims, 10 Drawing Sheets

(56) References Cited

U.S. PATENT DOCUMENTS

2016/0300020 A1* 10/2016 Wetta .................... G16H 10/60
2017/0068732 A1*  3/2017 Newman ............... G06F 16/245
2017/0147834 A1*  5/2017 Bendersky .......... G06F 21/6245
2017/0193079 A1*  7/2017 Vartanov ................ H04L 51/06

* cited by examiner

| Filters | × | 1-11 of 11 | View: Tag QC ▼ | Sort by: Relevance ▼ | All Results: ◇ RESPONSIVE ◇ ATTORNEY-CLIENT ◇ WORK-PRODUCT |
|---|---|---|---|---|---|
| ∨ ◇ Tags | | INDICATORS | DOC ID | TAG COUNT | INFO |
| + ☐ Issue | | | | | |
| − ☐ Responsiveness | | ☐ VIDEO ⊙0 ⊘0 ⊟2 | 2021 ◇ 2 | | DATE 12/31/9999 11:59 PM CST<br>CUSTODIAN Unspecified Custodian<br>FILENAME javelin.mpg |
| ☐ Non-Responsive 1 | | | | | |
| ☐ Responsive 6 | | | | | |
| + ☐ Admin | | ☐ VIDEO ⊙0 ⊘0 ⊟2 | 2022 ◇ 2 | | DATE 12/31/9999 11:59 PM CST<br>CUSTODIAN Unspecified Custodian<br>FILENAME BRONZE.mpg |
| ☐ Untagged 3 | | | | | |
| ∨ ◎ DISCO AI | | ☐ EMAIL ⊙2 ⊘0 ⊟2 | 4 ◇ 1 | | DATE 1/25/2002 11:53 PM CST<br>SUBJECT Liz, Kate and Kim's...<br>FROM Liz Miller Kate Lee and...<br>TO Bart Lennon <<br>bart.lennon@enron.com> |
| ∨ ▭ Custodians | | | | | |
| ∨ ◎ Related Documents | | ☐ EMAIL ⊙2 ⊘0 ⊟0 | 8 ◇ 1 | | DATE 2/4/2002 6:23 PM CST<br>SUBJECT RE: Trader Assistant<br>FROM Miller Lynn <Lynn.Miller@...<br>TO Adams Tyler <<br>Tyler.Adams@ENRON.com> |
| ∨ ▥ Document Properties | | | | | |
| ∨ ⊙ People | | ☐ EMAIL ⊙0 ⊘4 ⊟2 | 2017 ◇ 3 | | DATE 10/4/2000 3:36 PM CDT<br>SUBJECT PWO: Athletes that DID NOT Qualify...<br>FROM Aretha Jones<br>TO Michael Stephens |
| ∨ ▭ Ingest Location | | | | | |

FROM FIG. 3A

| | | |
|---|---|---|
| ☐ | VIDEO<br>💬 0 📎 0<br>🏷 2 | 2019 🏷 2 | DATE 12/31/9999 11:59 PM CST<br>CUSTODIAN Unspecified Custodian<br>FILENAME GOLD.mpg |
| ☐ | VIDEO<br>💬 0 📎 0<br>🏷 2 | 2020 🏷 2 | DATE 12/31/9999 11:59 PM CST<br>CUSTODIAN Unspecified Custodian<br>FILENAME SILVER.mpg |
| ☐ | EMAIL<br>💬 0 📎 3<br>🏷 2 | 2023 🏷 1 | DATE 11/20/2001 9:06 PM CST<br>SUBJECT Things to do when the....<br>FROM Ring<br>TO 'James.Stine@enron.com' |
| ☐ | VIDEO<br>💬 0 📎 0<br>🏷 2 | 2024 | DATE 12/31/9999 11:59 PM CST<br>CUSTODIAN Unspecified Custodian<br>FILENAME cubicle hurdles.mpeg |
| ☐ | VIDEO<br>💬 0 📎 0<br>🏷 2 | 2025 | DATE 12/31/9999 11:59 PM CST<br>CUSTODIAN Unspecified Custodian<br>FILENAME Rowing.mpeg |
| ☐ | VIDEO<br>💬 0 📎 0<br>🏷 2 | 2026 | DATE 12/31/9999 11:59 PM CST<br>CUSTODIAN Unspecified Custodian<br>FILENAME Hallway races.mpeg |

FIG. 3B

| | DISCO Ediscovery | MENU ▾ | | | |
|---|---|---|---|---|---|
| | | tag(Responsive)+family | | | |

1-8 of 26    View: JJ-Responsive ▾    Sort by: Relevance ▾

| | INDICATORS | DOC ID | TAG COUNT | INFO | RESPONSIVE |
|---|---|---|---|---|---|
| ☐ | VIDEO<br>💬0 📎0<br>📁2 | 2021 | 🏷3 | DATE 12/31/9999 11:59 PM CST<br>CUSTODIAN Unspecified Custodian<br>FILENAME javelin.mpg | |
| ☐ | VIDEO<br>💬0 📎0<br>📁2 | 2022 | 🏷2 | DATE 12/31/9999 11:59 PM CST<br>CUSTODIAN Unspecified Custodian<br>FILENAME BRONZE.mpg | |
| ☐ | EMAIL<br>💬0 📎0<br>📁6 | 3 | 🏷2 | DATE 2/1/2002 1:37 AM CST<br>SUBJECT Start Date: 1/31/02; HourAhead hou...<br>FROM Schedule Crawler <dave.perry@enron...<br>TO Dave Perry <dave.perry@enron.com> | ✓ |
| ☐ | EMAIL<br>💬0 📎0<br>📁2 | 4 | 🏷1 | DATE 1/25/2002 11:53 PM CST<br>SUBJECT Liz, Kate and Kim's Housewar...<br>FROM Liz Miller Kate Lee and Kim...<br>TO Bart Lennon <bart.lennon@enron.com> | ✓ |
| ☐ | EMAIL<br>💬2 📎0<br>📁0 | 8 | 🏷1 | DATE 2/4/2002 6:23 PM CST<br>SUBJECT RE: Trader Assistant<br>FROM Miller Lynn <Lynn.Miller@ENR...<br>TO Adams Tyler <Tyler.Adams@ENRON.com> | ✓ |
| ☐ | EMAIL<br>💬0 📎1<br>📁4 | 1809 | 🏷4 | DATE 5/17/2001 11:04 AM CDT<br>SUBJECT EOL Average Deal Count by Trader a...<br>FROM Eric Johnson<br>TO Joe Myers;Mark Arnold;Rob Stuart | ✓ |
| ☐ | EMAIL<br>💬0 📎1<br>📁2 📄1 | 1845 | 🏷3 | DATE 1/11/2002 8:03 AM CST<br>SUBJECT NetcoOnline Launch Plans<br>FROM Riggens Dave <Dave.Riggins@ENRON...<br>TO DL-EOLNA Traders & Orig <DL-EOLNATra... | ✓ |

| | INDICATORS | TAG COUNT | DOC ID | BATES NUMBER | INFO |
|---|---|---|---|---|---|
| □ | EMAIL ⊘0 ⊘2 ▭0 | | 2503 | | DATE 3/8/2001 6:34 PM CST<br>SUBJECT Lou Allen for 12/00 and 01/01 P...<br>FROM Mary Johnson<br>TO Betty Marsh |
| □ | EXCEL ⊘0 ⊘0 ▭0 ▭1 | ⟡1 | 2504 | att000198 | DATE 6/13/2000 2:44 PM CST<br>CUSTODIAN Unspecified Custodian<br>FILENAME ENRONGAS(1200).xls |
| □ | EXCEL ⊘0 ⊘0 ▭0 ▭1 | ⟡1 | 2508 | att000197 | DATE 6/13/2000 2:44 PM CST<br>CUSTODIAN Unspecified Custodian<br>FILENAME ENRONGAS(0101).xls |
| □ | EMAIL ⊘0 ⊘1 ▭0 | ⟡1 | 2515 | att000002 | DATE 6/14/2000 2:26 PM CDT<br>FROM Billie Coleman<br>TO Frank Smith |
| □ | EXCEL ⊘0 ⊘0 ▭0 | ⟡1 | 2516 | att000192 | DATE 3/22/1998 3:04 PM CST<br>CUSTODIAN Unspecified Custodian<br>FILENAME east_swap.xls | tag(Hot)+family

1-15 of 102 (102 search hits)  View: Default - Copy (unsaved) ▼  Sort by: Relevance ▼

Save Search

TO FIG. 5B

FROM FIG. 5A

- ☐ EMAIL  
  💬 0  📎 2  
  ☐ 0  
  2539  
  DATE 10/11/2001 7:50 PM CDT  
  SUBJECT FW: Physical RFP Requests-for nOV...  
  FROM Ring  
  TO Luka;Dorian

- ☐ TEXT  
  💬 0  📎 0  
  ☐ 0  
  2540  
  DATE 12/31/9999 5:59 PM CST  
  CUSTODIAN Unspecified Custodian  
  FILENAME ATT87053.txt

- ☐ EXCEL  
  💬 0  📎 0  
  ☐ 0  
  2541  att000225  🏷 1  
  DATE 9/26/2001 10:16 AM CDT  
  CUSTODIAN Unspecified Custodian  
  FILENAME RFPloadinfo.xls

| | | | | | |
|---|---|---|---|---|---|
| tag(Hot)+family or tag(Responsive) | | | | | |
| 1-15 of 123 (111 search hits) View: Default - Copy *(unsaved)* ▼ Sort by: Relevance ▼ | | | | | |
| INDICATORS | TAG COUNT | DOC ID | BATES NUMBER | INFO | HOT RESPONSIVE |
| EMAIL ◎1 📎0 ☐0 | ◇ 1 | 3343 | att000116 | DATE 10/19/2001 4:48 PM CDT SUBJECT Fwd: FW: trick FROM Amanda Lee alee@hotmail.com@ENR... TO Erin.Bernard <Erin.Bernard@ENR... | ✓ |
| PPT ◎0 📎3 ☐0 | | 3344 | | DATE 7/27/1999 2:36 AM CDT CUSTODIAN Unspecified Custodian FILENAME Mind Reader.pps | |
| WORD ◎0 📎0 ☐0 | ◇ 1 | 3345 | | DATE 7/27/1999 2:35 AM CDT CUSTODIAN Unspecified Custodian FILENAME EmbeddedObject_01.doc | ✓ |
| WORD ◎0 📎0 ☐0 | | 3346 | | DATE 7/27/1999 2:35 AM CDT CUSTODIAN Unspecified Custodian FILENAME EmbeddedObject_03.doc | |
| WORD ◎0 📎0 ☐0 | | 3347 | | DATE 7/27/1999 2:35 AM CDT CUSTODIAN Unspecified Custodian FILENAME EmbeddedObject_02.doc | |

TO FIG. 6B

FROM FIG. 6A

- ☐ [EMAIL] ⊘0 📎0 ▢0  ◇1  12  DATE 2/1/2002 6:55 PM CST
  SUBJECT Breakfast on Tuesday
  FROM Meyers
  TO 'Markson;Adam F.'<adam.mark...  »

- ☐ [EMAIL] ⊘0 📎2 ▢0  ◇1  1976  DATE 3/20/2001 4:19 PM CST
  SUBJECT Larry Dresdon for 12/00 and 01/01 P...
  FROM Aaron Diaz
  TO Joe Maron  »

- ☐ [EXCEL] ⊘0 📎0 ▢1  ◇1  1977  DATE 6/13/2000 2:44 PM CDT
  CUSTODIAN Unspecified Custodian
  FILENAME ENRONGAS(0101).xls  »

- ☐ [EXCEL] ⊘0 📎0 ▢1       1979  DATE 6/13/2000 2:44 PM CDT
  CUSTODIAN Unspecified Custodian
  FILENAME ENRONGAS(1200).xls

FIG. 6B

SYSTEMS AND METHODS FOR SEARCHING RELATED DOCUMENTS AND ASSOCIATED SEARCH OPERATORS

RELATED APPLICATIONS

This application claims the benefit of priority under 35 U.S.C. § 119 to U.S. Provisional Application No. 63/182,144 filed Apr. 30, 2021, entitled "SYSTEMS AND METHODS FOR SEARCHING RELATED DOCUMENTS AND ASSOCIATED SEARCH OPERATORS," which is hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to search systems. More particularly, this disclosure relates to embodiments of systems and methods for search systems that allow for, and perform, queries including specifications for related documents. Specifically, this disclosure relates to embodiments of systems and methods for search systems that facilitate specification of complex search queries for related documents using simple operators and are capable of efficient implementation of these queries.

BACKGROUND

In the modern world, the vast majority of documents that are being created, utilized, and maintained are in electronic format. A number of different situations commonly arise that require an analysis or identification of certain relevant electronic documents from a relatively large pool of available electronic documents. These types of search problems crop up in a wide variety of contexts. For example, in litigation, an entity's documents may need to be reviewed in order to identify documents that may be relevant to one or more issues in a litigation. In other examples, certain regulatory filings may require review of a number of documents to identify documents that may be relevant to one or more issues in the regulatory filing.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what is to be shared with opposite parties. Additionally, during the course of the litigation each party may continually review those documents produced by the opposing party to locate documents relevant to the case at hand.

Litigation thus represents a microcosm of a more general problem raised by the high volume, and increasing presence and use of, electronic documents across a variety of different contexts. Namely, how can a large volume of electronic documents be understood, reviewed, or searched in order that documents relevant to a particular topic or user's interest may be located. To aid users in resolving these problems, a document analysis system may be provided in a given electronic context. A document analysis, document review, information retrieval, or search system (which all will be utilized here substantially interchangeably) is a computer program used to process a corpus of electronically stored information (referred to as the corpus) and allow users to analyze, review or navigate the information, or search the electronic information to return electronically stored information responsive to a search (also referred to as a query).

Accordingly, there is constantly a need for improved systems and methods for document analysis to assist in the analysis, review, navigation, or search of such electronic documents in order to allow such document analysis systems to better aid users engaged in such tasks, including allowing users to better identify relevant electronic documents from a pool of available electronic documents through improved searching mechanisms.

SUMMARY

To continue with the above discussion, a document analysis system may be provided to aid in the understanding, review, or searching of a corpus of electronic documents. Items of electronic information that form a corpus may be referred to interchangeably as (electronic) documents, items, files, objects, items, content, etc. and may include objects such as files of almost any type including documents for various editing applications, emails, workflows, etc. Among other features, document analysis systems provide for searching the corpus of documents. Thus, using the document analysis system, a user may submit a query and a search engine selects a set of results from the corpus based on the terms of the search query. The terms of search queries usually specify words, terms, phrases, logical relationships, metadata fields to be searched, synonyms, stemming variations, etc. For example, most people are familiar with generally available Internet or web based search engines such as Google or Microsoft's Bing. Additionally, most computer applications tailored to a particular context may include their own proprietary search engines. In the context of litigation or discovery, for example, many Technology Assisted Review (TAR) applications may include their own search engine.

In many instances, however, certain of the documents of a corpus may include other documents such that the document contains other documents (e.g., have included other documents in their original context or source system), where these documents may be nested multiple levels deep. Emails and their attachments are examples of such nested documents. When such documents are ingested by a document analysis system it may be the case the documents are "flattened" such that each document is stored separately in the corpus of documents and may be separately searchable. Thus, while an email may have included an attachment (e.g., a file attached to the email), the email and the included attachment may be distinct documents within the corpus of documents being utilized with a document analysis system.

The term "family" may be used to refer to a document and the document(s) it included (or, in certain cases, documents which include that document), while the term "loose" document may refer to a document with no family members. Specifically, as an example, the encompassing document (e.g., email) is a parent while the included document(s) (e.g., the attachment) are children. A child document (e.g., attachment) can have documents inside them as well; imagine a Word document with an embedded Excel spreadsheet. In the context of this disclosure, the document inside a child (e.g., attachment) may be referred to as the grandchild of the parent document. Additionally, each family of documents may have a "head" (or root) which is a document that is a member of the family that has one or more child documents but no parent document.

These types of nested documents including emails (and their attachments) are thus a problematic subset of the documents analyzed by such document analysis system, as users of a document analysis system may wish to be presented (e.g., review or access, etc.) a document in the context of its family. Moreover, in a litigation context requirements often exist that dictate that the entire family of documents be produced even when only one document of the family may be relevant. Conversely, care must be taken in certain cases not to produce a document if any of its family members are privileged, or to produce a privileged document that is a member of a family when other documents of the family are produced.

Thus, users may wish to search these families of documents in a particular and precise manner. For example, a user may want to return entire document families when searching, so the user can assess, navigate, and review documents within their family context. The user may also want to specify a search for family membership with respect to search criteria or expressions (including individual terms) so the user can broaden or narrow their search scope (or portions of the search scope) using family relationships.

It is, however, difficult to accomplish such searches in an efficient and performative manner. Typically, such searches require multiple independent searches (e.g., passes) over the corpus of documents, and the storage and processing and cross-referencing of intermediary results (e.g., in temporary folders or memory). Accordingly, these types of searches for family members usually necessitate some type of external overseer process that coordinates these multiple searches and storage of intermediate results. As such these types of searches are slow and inefficient, consuming a relatively large amount of computing resource (e.g., memory, processor time, database accesses, etc.). Moreover, the specification of such searches may be complex, as multiple criteria or attributes of documents may need to be specified in various search expressions to achieve a search of related family members.

What is desired then, are search operators that allow simple fine grained specification of the search for family members that may be utilized with respect to a search query, or individual search expressions (including individual terms) of a search query, where the execution of such search operators may be efficiently implemented.

To address these desires, and the shortcomings of certain approaches to the searching of families of documents, among other ends, embodiments of the systems and methods as disclosed may provide a search system that is adapted to utilize a family search operator that may be used with respect to a search query, or an individual expression of a search query (including a single term). Such a family search operator may designate that all documents that match the expression encompassed by the family search operator (referred to as an "inner expression"), or having a family member that matched the inner expression of the family search operator, may be returned. Thus, even if a document does not match the inner expression it may be returned as a search hit if it has a family member (e.g., has a parent document, child document or sibling document) that matches the inner expression.

In particular, in embodiments a single unary family search operator may be provided such that the family search operator may be attached to a search expression (e.g., the family search operator may be a prefix, infix or postfix operator of an "inner expression") in a query language, such as domain query language or domain specific query language (collectively DQL), utilized by the search system of the document analysis system. For example, such a search operator may be postfix operator of the syntax "+family" such that the syntax "<inner expression> +family" may serve to apply the family search operator to the "<inner expression>". Other syntaxes are possible and are fully contemplated herein without loss of generality.

During execution of the search, the family search expression (i.e., the inner search expression and the family search operator) can be identified by the search system of the document analysis system. For example, the search query may be parsed using one or more rules (e.g., grammar rules to identify the token for the family search operator) that identify the family search operator (e.g., "+family") along with the inner expression to which the family search operator applies. In one embodiment, a grammar token to identify the family search operator (e.g., +family) may be utilized along with a recursive expression grammar rule to identify inner expressions postfixed with that family search operator (e.g., +family) token.

The search system can then generate a query for the search engine utilized by the search system. This search engine query may be in a query language utilized by the search engine, such as a DQL designed for Elasticsearch or the like. Specifically, a query generator of the search system may generate a search engine query for the family search expression by first generating a search engine query for the inner expression of the family search expression. This search engine query can then be wrapped with a search engine query wrapper that applies the search engine query for the inner expression multiple times to formulate a search engine query that will determine (and return) documents that are responsive to the inner expression, documents where a child of the document is responsive to the inner expression, documents where the parent of the document is responsive to the inner expression, and documents where a sibling (e.g., another child document of the parent of the document) is responsive to the inner expression.

Specifically, in certain embodiments, the search engine query wrapper allows execution of a family search expression in a single pass (e.g., over the corpus) by generating a family search engine query based on the inner expression (e.g., formulated in the query language utilized by the search engine of the search system), where the family search engine query specifies that for a document to match the family search expression it must match the inner expression or must not match the inner expression and must have a child, parent or sibling that is responsive to the inner expression. To accomplish this, the search engine query wrapper may leverage the matching methodology of the search engine or native storage environment (e.g., BitSet matching as utilized in Elasticsearch) to execute a search for a family search expression in a single pass.

By providing embodiments of such a family search operator that may be used to specify family search expression, and providing for the execution of such family search expressions in a single pass without the use of any supervisory process or intermediary storage of results, embodiments as presented herein may have a number of advantages. In particular, embodiments may provide an easily usable, syntactically clear, powerful, single pass family search operator that is both performant (e.g., may utilize less computing resources such as memory and processor time, and require less time to return results to a user) and that may be easily utilized in a variety of contexts.

Embodiments may thus be usefully applied in a myriad number of scenarios. For example, such family search operators may be useful in general searching of these nested documents, such as emails (or family members of these emails) sent to an important party, that include a key word or phrase. Other users may utilize a family search operator to search for documents in a litigation context for control of various documents, such as quality control of privileged documents (e.g., as maintained in a privilege log or the like). For example, a family search operator may useful in finding documents that should be produced in response to a subpoena or other litigation request (e.g., documents having an associated "responsive" tag, or other tag or information indicating responsiveness) and family members of those response documents (e.g., because documents may be produced with their family or as they are stored in the ordinary conduct of business), while excluding privileged documents (e.g., document tagged "privileged" or other tag or information indicating privileged).

Another scenario in which a family search operator may prove useful to find privileged documents, or family members of privileged documents, within responsive families, or find documents that are both responsive and privileged. A similar scenario for use of a family search operator is to find non-responsive documents (e.g., documents that have not been tagged "responsive"), or family members of non-responsive documents, but not responsive documents nor family members of responsive documents. Such a family search operator may also be useful for finding inconsistently tagged families such as finding families of documents where some, but not all, documents are tagged responsive.

As illustrated by the above examples, such a family search operator may be usefully applied for a variety of useful searches and in a wide array of contexts. It will be noted here that these examples are presented by way of illustration only, and that a number of other applications and uses of embodiments of such a family search operator will be apparent to those of skill in the art after reading this disclosure, all of which are fully contemplated herein.

Generally, then, these, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 3A, 3B, 4, 5A, 5B, 6A and 6B are depictions of search interfaces for use with a document analysis system providing a family search operator.

DETAILED DESCRIPTION

Figure 1A:
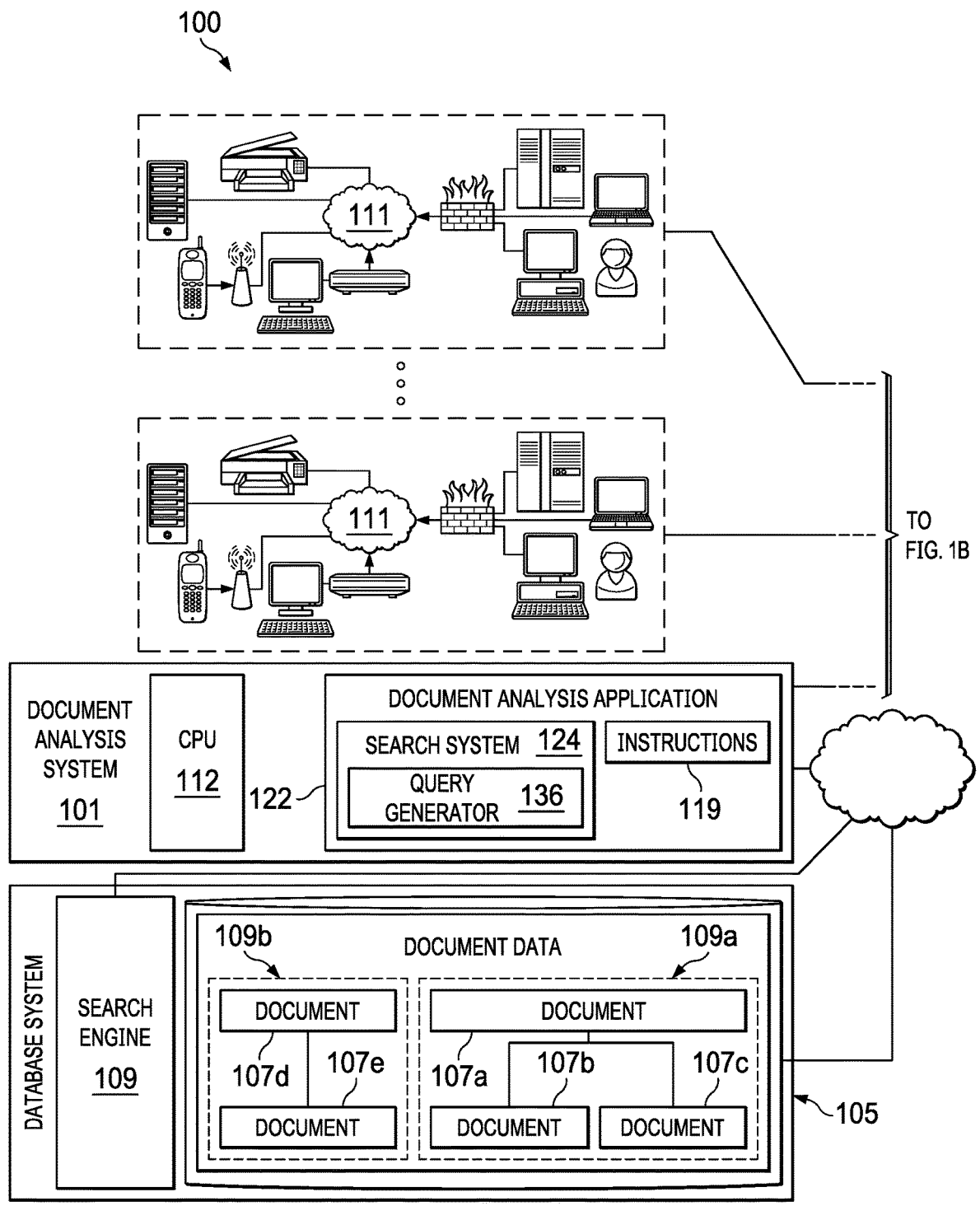
FIGS. 1A and 1B are a block diagram of one embodiment of an architecture including a document analysis system.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around document analysis systems. As mentioned above, the vast majority of documents that are currently being created, utilized, and maintained are in electronic format. A number of different situations commonly arise that require an analysis or identification of certain relevant electronic documents from a relatively large pool of available electronic documents. For example, in litigation, an entity's documents may need to be reviewed in order to identify documents that may be relevant to one or more issues in the litigation.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what to be shared with opposite parties. Additionally, during the course of the litigation each party may continually review those documents produced by the opposing party to locate documents relevant to the case at hand. Litigation thus represents a microcosm of a more general problem raised by the high volume of electronic documents present in a variety of contexts. Namely, how can a large volume of electronic documents be understood, reviewed, or searched in order that documents relevant to a particular topic or user's interest may be located.

To aid users in resolving these problems, a document analysis system, may be provided in a given electronic context. A document analysis system is a computer system used to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc.

Thus, using such a document analysis system, a user may submit a query and a search engine utilized by the document analysis system selects a set of results from the corpus based on the terms of the search query. The terms of search queries usually specify words, terms, phrases, logical relationships, metadata fields to be searched, synonyms, stemming variations, etc. Many document analysis systems may include their own proprietary search engines. In the context of litigation or discovery, for example, many Technology Assisted Review (TAR) applications may include their own search engine.

In many instances, however, certain of the documents of a corpus may include other documents, such that the document contains other documents (e.g., these documents may have included other documents in their original context or source system), where these documents may be nested multiple levels deep. Emails and their attachments are examples of such nested documents. Emails are ubiquitous within almost all modern enterprises, serving as the almost de-facto form of communication in such enterprises. It is thus often required to obtain and review such emails in the course of a litigation or other type of document review. As such, a document analysis system may provide a mechanism by which users can be review and search these emails and associated data.

These types of nested documents including emails (and their attachments) are thus a problematic subset of the documents analyzed by such document analysis system, as users of a document analysis system may wish to be presented (e.g., review or access, etc.) a document in the context of its family. Moreover, in a litigation context, requirements often exist that dictate that the entire family of documents be produced even when only one document of the family may be relevant. Conversely, care must be taken in certain cases not to produce a document if any of its family members are privileged, or to produce a privileged document that is a member of a family when other documents of the family are produced.

Thus, users may wish to search families of documents in a particular and precise manner when utilizing a document analysis system. For example, a user may want to return entire document families when searching, so the user can assess, navigate, and review documents within their family context. The user may also want to specify a search for family membership with respect to search criteria or expressions (including individual terms) so the user can broaden or narrow their search scope (or portions of the search scope) using family relationships.

It is, however, difficult to accomplish such searches in an efficient and performative manner. Typically, such searches require multiple independent searches (e.g., passes) over the corpus of documents, and the storage and processing and cross-referencing of intermediary results (e.g., in temporary folders or memory). Accordingly, these types of searches for family members usually necessitate some type of external overseer process that coordinates these multiple searches and storage of intermediate results. As such, these types of searches are slow and inefficient, consuming a relatively large amount of computing resource (e.g., memory, processor time, database accesses, etc.). Moreover, the specification of such searches may be complex, as multiple criteria or attributes of documents may need to be specified in various search expressions to achieve a search of related family members.

What is desired then, are search operators that allow simple fine grained specification of the search for family members that may be utilized with respect to a search query, or individual search expressions (including individual terms) of a search query, where the execution of such search operators may be efficiently implemented.

To address these desires, and the shortcomings of certain approaches to the searching of families of documents, among other ends, embodiments of the systems and methods as disclosed may provide a search system that is adapted to utilize a family search operator that may be used for a search query, or individual expressions of a search query (including a single term). Such a family search operator may designate that all documents that match the expression encompassed by the family search operator (referred to as an "inner expression"), or having a family member that matched the inner expression of the family search operator, may be returned. Thus, even if a document does not match the inner expression it may be returned as a search hit if it has a family member (e.g., has a parent document, child document or sibling document) that matches the inner expression.

Figure 1B:
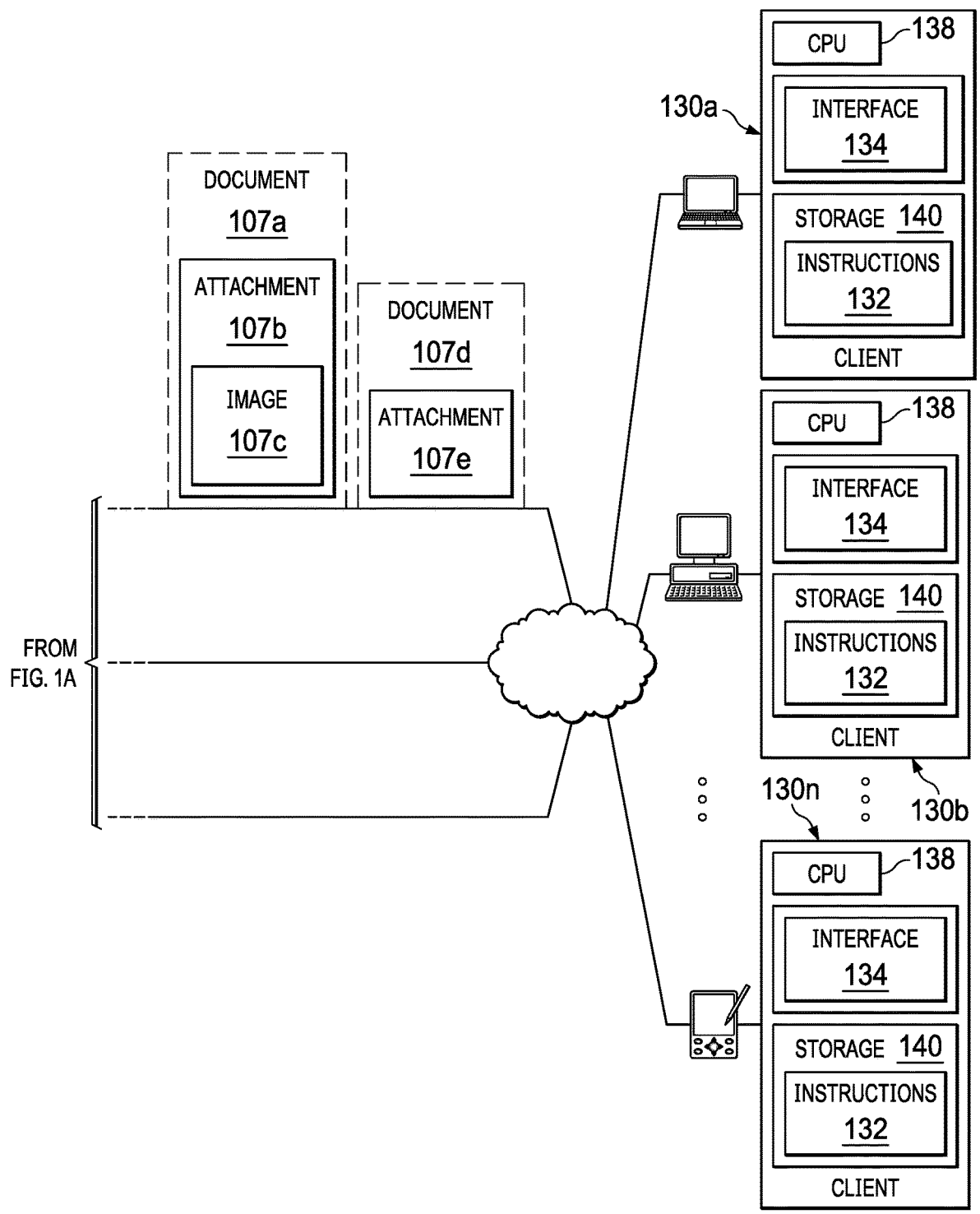

Looking now at FIGS. 1A and 1B, a block diagram of one embodiment of a document analysis system the provides such a family search operator is depicted. The document analysis system 101 is part of computing environment 100 including a database system 105, document analysis system 101, and one or more client computers 130.

In the depicted embodiment document analysis system 101 may include one or more (virtual or physical) servers or other type of computing device utilizing a central processing unit 112 connected to a memory and a data store (e.g., via a bus). Central processing unit 112 may represent a single processor, multiple processors, a processor(s) with multiple processing cores and the like. The data store may include a volatile or non-volatile non-transitory storage medium such as RAM, hard disk drives, flash memory devices, optical media, or the like. Document analysis system 101 may be connected to a data communications network such as the Internet, a local area network (LAN), a wide area network (WAN), a cellular network or some other network or combination of networks.

The data store stores computer executable instructions 119. Computer executable instructions 119 can represent one or more multiple programs or operating system instructions. In one embodiment, instructions 119 are executable to provide document analysis application 122. Document analysis application 122 may be implemented on the same computing systems or can be distributed across multiple computing systems, platforms or physical or virtual server. The document analysis system 101 can be a multi-tenant document analysis system whereby the services provided by the document analysis system 101 may be accessed by users associated with different entities (e.g., enterprises, organizations, etc.) to perform those services on data associated with those entities. Again, it will be noted here that while embodiments described and depicted with respect to FIGS. 1A and 1B include a deployment of a document analysis system on a physical computing device other embodiments may include the document analysis system deployed as a service on, for example, a cloud computing environment or otherwise deployed without loss of generality.

Client computer system 130 may include components similar to those of the server of document analysis system 101, such as CPU 138 and data store 140. Additionally, client computer system 130 may include executable instructions 132 to provide user interface 134 that allows a user to interact with document analysis system 101 to review the documents 107 of the corpus. These instructions 132 may have, for example, been provided by document analysis system 101 in response to an access by client computer 130. For example, user interface 134 may be provided through a web browser, file system interface or other method without loss of generality. Moreover, user interface 134 may interact (e.g., issue requests, receive responses, etc.) with a corresponding interface 136 of the document analysis application 122, which may be, for example a web services interface, an Application Programming Interface (API) or another type of interface.

Again, those skilled in the art will appreciate that document analysis system 101 shown in FIGS. 1A and 1B is merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer 130 may include any suitable desktop computer, laptop, mobile device, server, or other computing system.

Database system 105 utilized by document analysis system 101 may comprise a file server or database system or other storage mechanism remotely or locally accessible by document analysis system 101 which, according to an embodiment, may be almost any NoSQL or SQL platform. Specifically, in one embodiment database system 105 may be, for example, an Elasticsearch NoSQL datastore. Additionally, in some embodiments database system 105 may include search (also referred to as a database) engine 109, such as an Elasticsearch based search engine or the like. Elasticsearch is an open source, Lucene-based search and analytics engine that provides a distributed multi-user capable search engine that is accessible through various interfaces, including for example, RESTful interfaces or the like. Such a search engine 109 may thus be used for performing search (e.g., or other access or analysis) on data stored in database system 105. In one embodiment, the database engine 109 may include multiple compute nodes or clusters that can perform parallel processing on data stored at the database system 105 based on requests or instructions received at database engine 109.

Thus, at some time interval, document analysis system 101 may obtain data on documents, including nested documents or the like from one or more source systems within an enterprise environment 111. Certain of the documents may include other documents such that the document contains other documents in their original context or source system within the enterprise environment 111. These documents may be listed multiple levels deep (e.g., an email may have a Word document attached, where that Word document includes an Excel spreadsheet, etc.). Emails and their attachments are examples of such nested documents. It will be noted here that while emails have been used as example nested documents throughout this disclosures for ease and simplicity of description, embodiments of family search operators and their implementation in document analysis systems are equally applicable to almost all other types of nested documents and may applied to these other types of nested documents with equal efficacy.

The term "family" may be used to refer to a document and the document(s) it includes (or, in certain cases, documents which include that document), while the term "loose" document may refer to a document with no family members. Specifically, as an example, the encompassing document (e.g., email) is a parent while the included document(s) (e.g., the attachment) are children. A child document (e.g., attachment) can have documents inside them as well; imagine a Word document with an embedded Excel spreadsheet. In the context of this disclosure, the document inside a child (e.g., attachment) may be referred to as the grandchild of the parent document. Additionally, each family of documents may have a "head" (or root) which is a document that is a member of the family that has one or more child documents but no parent document.

Accordingly, document analysis system 101 may obtain data on documents 107, including loose documents, or one or more nested documents, from one more source systems and store the document data 107 at the database system 105. These source systems may, for example, be email servers, user's computers, or other sources within an enterprise environment 111, or another type of source system that may be external to an enterprise environment 111. Thus, the family relationships between documents 107 (e.g., which documents 107 contain which other documents 107) is a structural relationship that is provided by the source system (or can be obtained or determined from such data from the source system) Here, for example, document 107*a* contains an attached document 107*b* which, in turn, includes an image document 170*c* while document 107*d* contains an attached document 107*e*. This document data 107 may include for example, the documents themselves or metadata associated with documents 107 (e.g., metadata associated with emails sent from or received by particular users or email addresses, etc.).

These documents 107 are stored by the document analysis system 101 in the database system 105. In some embodiments, when such documents 107 are ingested by a document analysis system 101 the documents 107 are "flattened" such that each document 107 is stored separately in the corpus of documents 107 at the database system 105 and is separately searchable. Continuing with the above example, documents 107*a*, 107*b*, 170*c*, 107*d* and 107*e* may be stored separately at the database system 105 and may be separately searchable.

Additionally, when storing these documents 107 in database system 105, the document analysis system 101 may encode or otherwise represent the family relationships between document 107 as determined from the source systems within the enterprise environment 111 such that the corpus of documents 107 includes families of documents. Thus, the document analysis system 101 may determine if a document 107 contains another document 107. If a document 107 contains another document it is given a parent child relationship (e.g., the document 107 containing the other document 107 is the parent of the other document 107, while the other document 107 is a child of the parent document 107). Each family of documents 107 thus has a "head" that has one or more child documents 107, but no parent document 107.

In some cases, every document 107 that is a child document 107 may be (or may additionally be) assigned a child relationship to the head (document 107) of the family. Again, continuing further with the above example, document 107*a*, 107*b* and 107*c* may be stored at database system 105 as members of family 109*a*. Moreover, document 107*a* is a head of family 109*a* by virtue of having a parent relationship to documents 107*b* and document 107*c*. Documents 107*b* and 107*c* therefore both have a child relationship to document 107*a*. Notice that both documents 107*b* and 107*c* have a child relationship to document 107*a* (and document 107*a* is a parent of both document 107*b* and 107*c*) even through document 107*a* contained document 107*b* and document 107*b* contained document 107*c*. Documents 107*d* and 107*e* are members of family 109*b*. Document 107*d* is a head of family 109*b* by virtue of having a parent relationship to document 107*e* and document 107*e* having a child relationship to document 107*d*.

The user may interact with the documents 107 through the document analysis system 101 to perform various tasks, including review and of these tagging of documents 107. To allow a user to search or otherwise access or analyze the document 107 stored in the database system 105, the document analysis application 122 may provide search system 124. Search system 124 may provide an interface through which users may search document data 107. In many cases, such an interface may present an interface by which a search query specifying document (or other) criteria may be entered and the document 107 in database system 105 responsive to the request may be determined and returned to the user through the search interface. The interface may present, for example, a number of "search hits" that indicates the number of documents 107 deemed responsive to the search query along with an identification of the responsive documents 107 or data associated therewith. The user can then interact with the search interface to refine the search, navigate the responsive documents 107, or preform other actions.

In particular, the search system 124 may be adapted to receive a search query comprising one or more search expressions (including individual terms) in a search syntax utilized by the search system 124 such as a domain query language or domain specific query language (collectively DQL). Such a syntax may include operators such as exact phrase operators (e.g., " "), grouping operators: (e.g., ( )), proximity operators (e.g., /n, +n), or Boolean operators such as and (e.g., &) or not (e.g., %), or (e.g., or), or other search operators.

A received search query may be provided to query generator 136 which may form a query adapted to be executed by search engine 109 (also referred to as the database engine) of database system 105 (e.g., an Elasticsearch query or the like in the syntax utilized by the search engine 109) and provide the generated search engine query to the search engine 109 of database system 105. The documents returned by the search engine 109 can then be deemed responsive to the search engine query and returned to the user through the search interface.

As discussed, nested documents including emails (and their attachments) are a problematic subset of the documents 107 as users may wish to be presented (e.g., search, review, or access, etc.) a document in the context of its family. Moreover, in a litigation context requirements often exist that dictate that the entire family 109 of documents 107 be produced even when only one document of the family may be relevant (e.g., a document 107 is tagged "relevant"). Conversely, it is not desirable to produce a document 107 if any of its family members are privileged (e.g., have been tagged with a "privilege" tag), or to produce a privileged document 107 that is a member of a family 109 when other documents 107 of the family 109 are produced.

Accordingly, users may wish to search these families 109 of documents 107 in a particular and precise manner. For example, a user may want to return entire document families 109 when searching, so the user can assess, navigate, and review documents 107 within their family context. The user may also want to specify a search for family membership with respect to search criteria or expressions (including individual terms) so the user can broaden or narrow their search scope (or portions of the search scope) using family relationships.

Thus, the search syntax provided by search system 124 may include a family search operator that allows simple fine grained specification of a search expression for family members, where the execution of such search operators may be efficiently implemented. Specifically, search system 124 may be adapted to utilize a family search operator that may be used with respect to a search query, or an individual expression of a search query (including a single term). Such a family search operator may designate that all documents 107 that match the expression encompassed by the family search operator (referred to as an "inner expression"), or having a family member that matched the inner expression of the family search operator, may be returned. Thus, even if a document 107 does not match the inner expression it may be returned as a search hit if it has a family member (e.g., has a parent document, child document or sibling document) that matches the inner expression.

In particular, in embodiments search system 124 may be adapted to generate search queries based on a single unary family search operator such that the family search operator may be attached to a search expression (e.g., the family search operator may be a prefix, infix or postfix operator of an "inner expression") in the query language utilized by the search system 124. For example, such a search operator may be postfix operator of the syntax "+family" such that the syntax "<inner expression> +family" may serve to apply the family search operator to the "<inner expression>" such that documents that match the inner expression, or have a family member that matched the inner expression, may be identified by that family search expression. In other words, in some cases, the family search operator may be adapted to search for one or more families of documents, where at least one document of each family of the one or more families is responsive to the inner expression.

Accordingly, in certain embodiments, the "+family" search operator can be added to any valid query, or any portion of a query, that would be a valid standalone query. In some cases, the +family search operator does not limit the search results set to only families of documents, but will return loose documents that meet the inner expression. Moreover, the documents responsive to the family search expression may all be counted as search hits (e.g., for the family search expression). Other syntaxes and functionality are possible and are fully contemplated herein without loss of generality.

During execution of the search, the family search expression (i.e., the inner search expression and the family search operator) can be identified by the query generator 136 of the search system 124. For example, the search query may be parsed using one or more rules (e.g., grammar rules to identify the token for the family search operator) that identify the family search operator (e.g., "+family") along with the inner expression to which the family search operator applies.

In one embodiment, the query generator 136 may utilize a grammar token to identify the family search operator (e.g., +family) along with a recursive expression grammar rule to identify the inner expressions postfixed with that family search operator (e.g., +family) token. A grammar token may be utilized to identify the family search operator (e.g., "+family") in a case insensitive manner. For example, the following rules may be utilized by embodiments of a query generator 136 to identify search operators in a search syntax utilized by the search system 124, including a family search operator of the form "+family".

```
expr:
    FAMILY_CONSISTENT_OPEN expr PAREN_CLOSE       # FamilyConExpr
    | FAMILY_INCONSISTENT_OPEN expr PAREN_CLOSE   # FamilyIncExpr
    | expr FAMILY                                  # FamilyExpr
    | PAREN_OPEN expr PAREN_CLOSE                  # GroupExpr
    | proximityQuery (proximityConnector proximityQuery) +   # ProximityExpr
    | expr NOT expr                                # AndNotExpr
    | expr AND expr                                # AndExpr
    | AND expr                                     # LeadingAndExpr
    | expr AND                                     # TrailingAndExpr
    | expr OR expr                                 # OrExpr
    | expr                                       # OrExpr
    | PHRASE_OPEN phrasePart+ PHRASE_CLOSE         # PhraseExpr
    | (TERM | INTEGER)                             # TermExpr
    | STAR                                         # EverythingExpr
    | FIELD_QUERY_OPEN fieldQuery PAREN_CLOSE      # FieldExpr
    | FUZZY                                        # FuzzyExpr
    | WILDCARD                                     # WildcardExpr
    | FIELD_QUERY_OPEN fieldQueryList PAREN_CLOSE  # FieldExpr
    ;
```

The search system 124 can then generate a query for the search engine 109 of the database system 105. This search engine query may be in a query language utilized by the search engine 109, such as an Elasticsearch query or the like. Specifically, query generator 136 of the search system may generate a search engine query corresponding to the family search expression by first generating a search engine query for the inner expression of the family search expression. This inner expression search engine query (e.g., the inner expression in a form utilized by search engine 109) is adapted to cause a search engine to search the corpus of documents for a document meeting the inner expression The generated inner expression search engine query can then be wrapped with a search engine query wrapper that is adapted to allow the search engine 109 to apply the inner expression search engine query multiple times to determine (and return) documents that are responsive to the inner expression, documents where a child of the document is responsive to the inner expression, documents where the parent of the document is responsive to the inner expression, and documents where a sibling (e.g., another child document of the parent of the document) is responsive to the inner expression.

Specifically, in certain embodiments, the search engine query wrapper allows execution of a family search expression by search engine 109 in a single pass by generating a family search engine query based on the inner expression (e.g., formulated in the query language utilized by the search engine of the search system), where the family search engine query specifies that for a document 107 to match the family search expression it must match the inner expression, or must not match the inner expression and must have a child, parent or sibling that is responsive to the inner expression. Thus, in certain embodiments, the family search engine query is adapted to cause a search engine to search the corpus of document in a single pass to determine one or more families of documents, where at least one document of each family of the one or more families is responsive to the inner expression. To accomplish this, the search engine query wrapper may leverage the matching methodology of the search engine 109 or native storage environment (e.g., BitSet matching as utilized in Elasticsearch) to execute a search for the family search expression in a single pass.

Thus, when family search expressions are processed by the query generator 136 the query generator 136 may use the existing query generation logic for the inner expression to generate an inner expression search engine query and place that inner expression search engine query in a wrapper (e.g., implemented as a template) adapted to implement the family search operator such that a family search engine query for the family search expression is generated.

In one embodiment, the following is a template for a family search operator that may be utilized to wrap an inner expression (where "INNER QUERY" represents the inner expression of the family search expression formulated in the query language utilized by the search engine).

```
"bool": { ""
    "must": [
        {
            "bool": {
                "should": [
                    {
                        "bool": {
                            "must": [
                                {
                                    INNER QUERY
                                }
                            ]
                        }
                    },
                    {
                        "bool": {
                            "must_not": [
                                {
                                    INNER QUERY
                                }
                            ],
                            "should": [
                                {
                                    "has_child": {
                                        "type": "frdm",
                                        "query": {
                                            INNER QUERY
                                        }
                                    }
                                },
                                {
                                    "has_parent": {
                                        "type": "frdm",
                                        "query": {
                                            INNER QUERY
                                        }
                                    }
                                },
                                {
                                    "has_parent": {
                                        "type": "frd",
```

-continued

```
            "query": {
                "has_child": {
                    "type": "frdm",
                    "query": {
                        INNER QUERY
                    }
                }
            }
        }
      ],
      "minimum_should_match": 1
    }
  }
],
"minimum_should_match": 1
      }
    }
  ]
}
```

The family search engine query for the family search expression generated by the query generator 136 can then be provided to the search engine 109 of the database system 105 (e.g., alone with any other portions of a search query in which the family search expression was included). The documents 107 returned by the search engine 109 are then presented to the user, or otherwise utilized by the document analysis system 101 (e.g., when the documents returned by the search engine 109 are utilized by document analysis system 101 in another process of for another purpose). In particular, each of the one or more families 109 of documents 107 may be returned in response to the family search expression, wherein returning the one or more families 109 of documents 107 comprises returning each document 107 of each family of the one or more families 109.

By providing embodiments of such a family search operator that may be used to specify family search expression, and providing for the execution of such family search expressions in a single pass without the use of any supervisory process or intermediary storage of results, embodiments as presented herein may have a number of advantages. In particular, embodiments may provide an easily usable, syntactically clear, powerful, single pass family search operator that is both performant (e.g., may utilize less computing resources such as memory and processor time, and require less time to return results to a user) and that may be easily utilized in a variety of contexts.

Embodiments may thus be usefully applied in a myriad number of scenarios. For example, such family search operators may be useful in general searching of nested documents, such as emails (or family members of these emails) sent to an important party, that include a key word or phrase. Other users may utilize a family search operator to search for documents in a litigation context for control of various documents, such as quality control of privileged documents (e.g., as maintained in a privilege log or the like). For example, a family search operator may useful in finding documents that should be produced in response to a subpoena or other litigation request (e.g., documents having an associated "responsive" tag, or other tag or information indicating responsiveness) and family members of those response documents (e.g., because documents may be produced with their family or as they are stored in the ordinary conduct of business), while excluding privileged documents (e.g., document tagged "privileged" or other tag or information indicating privileged).

Another scenario in which a family search operator may prove useful to find privileged documents, or family members of privileged documents, within responsive families, or find documents that are both responsive and privileged. A similar scenario for use of a family search operator is to find non-responsive documents (e.g., documents that have not been tagged "responsive"), or family members of non-responsive documents, but not responsive documents nor family members of responsive documents. Such a family search operator may also be useful for finding inconsistently tagged families such as finding families of documents where some, but not all, documents are tagged responsive.

As illustrated by the above examples, such a family search operator may be usefully applied for a variety of useful searches and in a wide array of contexts. It will be noted here that these examples are presented by way of illustration only, and that a number of other applications and uses of embodiments of such a family search operator will be apparent to those of skill in the art after reading this disclosure, all of which are fully contemplated herein.

It may now be useful to go over some of these examples that may be useful in various contexts The following are examples of searches in embodiments of the described search syntax that may return documents that are producible (or should not be produced) in a litigation context. The following search expressed in the search syntax may, for example find "responsive" documents (e.g., document which are associated with a tag "responsive") and documents whose family members are tagged "responsive", but not "privileged" documents (e.g., documents which are associated with a "privileged" tag) nor documents whose family members are tagged "privileged":

tag(Responsive)+family % tagGroup(Privilege)+family

The following search expressed in the search syntax may, for example, find "responsive" documents (e.g., document which are associated with a tag "responsive") but not those that are certain types of privileged documents. Here, the search may be adapted to find documents whose family members are tagged "responsive" and their family members, but not "attorney-client" documents (e.g., documents which are associated with a tag "attorney-Client") nor documents whose family members are tagged "attorney-client", nor "work-product" documents (e.g., documents which are associated with a tag "work-product"), nor documents whose family members are tagged "work-product":

tag(Responsive)+family % tag(Attorney-Client or Work-Product)+family

The following search expressed in the search syntax may, be adapted to find "non-responsive" documents (e.g., document which are associated with a tag "non-responsive"), but not those that are "responsive" (e.g., tagged with "responsive". This search may thus be adapted to find documents whose family members are tagged "non-responsive" and their family members, but not "responsive" documents (e.g., documents which are associated with a tag "responsive") nor documents whose family members are tagged "responsive".

tag(Non-Responsive)+family % tag(Responsive)+family

Searches may also be used to find inconsistently tagged families. For example, the following search expressed in the search syntax may be used to find families of documents where some, but not all of the documents are tagged responsive, as this search will return find "responsive" documents (e.g., document which are associated with a tag "responsive") and their family members, but not documents that are "responsive" (e.g., tagged with "responsive").

tag(Responsive)+family % tag(Responsive)

Figure 2:
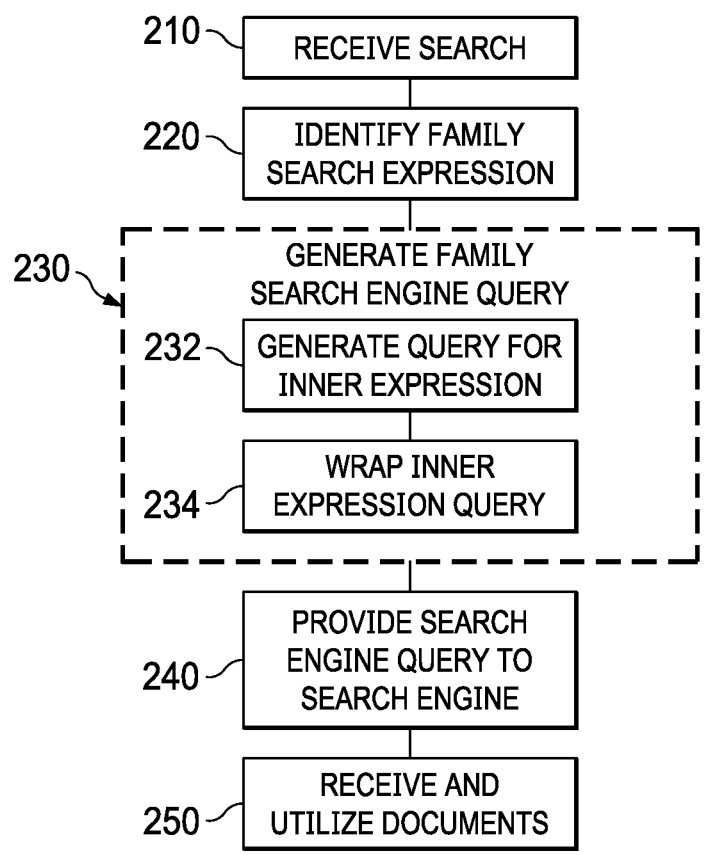
FIG. 2 is a flow diagram of a method for implementing a family search.

Referring now to FIG. 2, a flow diagram of one embodiment of a method for executing a search including a family search operator that may be utilized by a document analysis system is depicted. Initially, a search expressed in the search syntax of the search system may be received, where that search includes a family search operator (STEP 210). In some embodiments, a single unary family search operator may be provided in the search syntax such that the family search operator may be attached to a search expression (e.g., the family search operator may be a prefix, infix, or postfix operator of an "inner expression") in a query language, such as domain query language or DQL utilized by a search system of a document analysis system. For example, such a search operator may be postfix operator of the syntax "+family" such that the syntax "<inner expression> +family" may serve to apply the family search operator to the "<inner expression>".

During execution of the search, the family search expression (i.e., the inner search expression and the family search operator) can be identified (STEP 220). For example, the search query may be parsed using one or more rules (e.g., grammar rules to identify the token for the family search operator) that identify the family search operator (e.g., "+family") along with the inner expression to which the family search operator applies.

In one embodiment, a grammar token can be used to identify the family search operator (e.g., +family) along with a recursive expression grammar rule to identify the inner expressions postfixed with that family search operator (e.g., +family) token. This grammar token may be utilized to identify the family search operator (e.g., "+family") in a case insensitive manner. For example, the rules discussed above may be utilized to identify search operators in a search syntax utilized by the search system, including a family search operator of the form "+family".

The search system can then generate a query for the search engine of a database system utilized by the document analysis system (STEP 230). This search engine query may be in a query language utilized by a search engine, such as an Elasticsearch query or the like. Specifically, a search engine query corresponding to the family search expression may be generated by first generating a search engine query for the inner expression of the family search expression (STEP 232).

The generated inner expression search engine query (e.g., the inner expression in a form utilized by search engine 109) can then be wrapped with a search engine query wrapper (STEP 234). This wrapper may be adapted to allow the search engine to apply the inner expression search engine query multiple times to determine (and return) documents that are responsive to the inner expression, documents where a child of the document is responsive to the inner expression, documents where the parent of the document is responsive to the inner expression, and documents where a sibling (e.g., another child document of the parent of the document) is responsive to the inner expression.

Specifically, in certain embodiments, the search engine query wrapper allows execution of a family search expression by the search engine in a single pass by generating a family search engine query based on the inner expression (e.g., formulated in the query language utilized by the search engine of the search system), where the family search engine query specifies that for a document to match the family search expression it must match the inner expression, or must not match the inner expression and must have a child, parent or sibling that is responsive to the inner expression. To accomplish this, the search engine query wrapper may leverage the matching methodology of the search engine or native storage environment to execute a search for the family search expression in a single pass.

Thus, when family search expressions are processed the existing query generation logic may be used to generate an inner expression search engine query for the inner expression and place that inner expression search engine query in a wrapper (e.g., implemented as a template) adapted to implement the family search operator such that a family search engine query for the family search expression is generated. An example of a template for a family search operator that may be utilized to wrap an inner expression is given above.

The family search engine query for the family search expression can then be provided to the search engine of the database system (e.g., alone with any other portions of a search query in which the family search expression was included) (STEP 240). The documents returned by the search engine are then received and utilized (STEP 250). For example, the received documents may be presented to the user, or otherwise utilized by the document analysis system (e.g., when the documents returned by the search engine are utilized by document analysis system in another process of for another purpose).

Moving now to FIGS. 3-6, depictions of embodiments of search interfaces that may be utilized by a document analysis system are presented. FIGS. 3A and 3B, for example, depict one embodiment of a search interface where the results of the search "tag(Responsive)+family % tag(Attorney-Client or Work-Product)+family" are being presented to a user. FIG. 4 depicts an embodiments of an interface where the results of the search "tag(Responsive)+family" are being presented to a user. FIGS. 5A and 5B depict an embodiment of an interface where the results of the search "tag(Hot)+family" are being presented to a user. FIGS. 6A and 6B depict an embodiments of an interface where the results of the search "tag(Hot)+family or tag(Responsive)" are being presented to a user. Notice that with respect to all the depicted interfaces, the results of the search are counted as search hits.

As can be seen then, by providing embodiments of such a family search operator that may be used to specify family search expression, and providing for the execution of such family search expressions in a single pass without the use of any supervisory process or intermediary storage of results, embodiments as presented herein may have a number of advantages. In particular, embodiments may provide an easily usable, syntactically clear, powerful, single pass family search operator that is both performant (e.g., may utilize less computing resources such as memory and processor time, and require less time to return results to a user) and that may be easily utilized in a variety of contexts.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a stand-alone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system, comprising:
   a processor;
   a data store including a corpus of documents, wherein the documents comprise families of documents; and
   a non-transitory computer readable medium, comprising instructions for:
   receiving a search query to search a corpus of documents including families of documents, wherein the search query is expressed in a search syntax and includes a family search expression comprising a family search operator provided in the search syntax and an inner expression;
   identifying the family search expression based on the presence of the family search operator in the search query;
   determining the inner expression of the family expression by determining the inner expression to which the family search operator applies;
   generating an inner expression search engine query for the inner expression, wherein the inner expression search engine query is adapted to cause a search engine to search the corpus of documents for a document meeting the inner expression;
   generating a family search engine query by wrapping the inner expression search engine query with a family search engine query wrapper, wherein the family search engine query is adapted to cause a search engine to search the corpus of documents in a single pass to determine one or more families of documents in the single pass without a supervisory process or intermediary storage of results, where at least one document of each family of the one or more families is responsive to the inner expression, and wherein the family search engine query wrapper is adapted to allow the search engine to apply the inner expression search engine query multiple times in the single pass to determine: documents that are responsive to the inner expression, documents where a child of the document is responsive to the inner expression, documents where a parent of the document is responsive to the inner expression, and documents where a sibling is responsive to the inner expression;
   executing the family search engine query to determine the one or more families of documents; and
   returning each of the one or more families of documents in response to the family search expression, wherein returning the one or more families of documents comprises returning each document of each family of the one or more families.

2. The system of claim 1, wherein each document of each family of the one or more families is counted as responsive to the family search expression.

3. The system of claim 1, wherein the family search operator is identified based on a grammar token and the inner expression is identified using a recursive grammar rule.

4. The system of claim 1, wherein the search engine is an Elasticsearch search engine.

5. The system of claim 1, wherein the family search operator is a unary postfix operator.

6. A method, comprising:
   receiving a search query to search a corpus of documents including families of documents, wherein the search query is expressed in a search syntax and includes a family search expression comprising a family search operator provided in the search syntax and an inner expression;
   identifying the family search expression based on the presence of the family search operator in the search query;
   determining the inner expression of the family expression by determining the inner expression to which the family search operator applies;
   generating an inner expression search engine query for the inner expression, wherein the inner expression search engine query is adapted to cause a search engine to search the corpus of documents for a document meeting the inner expression;
   generating a family search engine query by wrapping the inner expression search engine query with a family search engine query wrapper, wherein the family search engine query is adapted to cause a search engine to search the corpus of document in a single pass to determine one or more families of documents in the single pass without a supervisory process or intermediary storage of results, where at least one document of each family of the one or more families is responsive to the inner expression, and wherein the family search engine query wrapper is adapted to allow the search engine to apply the inner expression search engine query multiple times in the single pass to determine: documents that are responsive to the inner expression, documents where a child of the document is responsive to the inner expression, documents where a parent of the document is responsive to the inner expression, and documents where a sibling is responsive to the inner expression;
   executing the family search engine query to determine the one or more families of documents; and
   returning each of the one or more families of documents in response to the family search expression, wherein returning the one or more families of documents comprises returning each document of each family of the one or more families.

7. The method of claim 6, wherein each document of each family of the one or more families is counted as responsive to the family search expression.

8. The method of claim 6, wherein the family search operator is identified based on a grammar token and the inner expression is identified using a recursive grammar rule.

9. The method of claim 6, wherein the search engine is an Elasticsearch search engine.

10. The method of claim 6, wherein the family search operator is a unary postfix operator.

11. A non-transitory computer readable medium, comprising instructions for:
    receiving a search query to search a corpus of documents including families of documents, wherein the search query is expressed in a search syntax and includes a family search expression comprising a family search operator provided in the search syntax and an inner expression;
    identifying the family search expression based on the presence of the family search operator in the search query;
    determining the inner expression of the family expression by determining the inner expression to which the family search operator applies;
    generating an inner expression search engine query for the inner expression, wherein the inner expression search engine query is adapted to cause a search engine to search the corpus of documents for a document meeting the inner expression;
    generating a family search engine query by wrapping the inner expression search engine query with a family search engine query wrapper, wherein the family search engine query is adapted to cause a search engine to search the corpus of document in a single pass to determine one or more families of documents in the single pass without a supervisory process or intermediary storage of results, where at least one document of each family of the one or more families is responsive to the inner expression, and wherein the family search engine query wrapper is adapted to allow the search engine to apply the inner expression search engine query multiple times in the single pass to determine: documents that are responsive to the inner expression, documents where a child of the document is responsive to the inner expression, documents where a parent of the document is responsive to the inner expression, and documents where a sibling is responsive to the inner expression;
    executing the family search engine query to determine the one or more families of documents; and
    returning each of the one or more families of documents in response to the family search expression, wherein returning the one or more families of documents comprises returning each document of each family of the one or more families.

12. The non-transitory computer readable medium of claim 11, wherein each document of each family of the one or more families is counted as responsive to the family search expression.

13. The non-transitory computer readable medium of claim 11, wherein the family search operator is identified based on a grammar token and the inner expression is identified using a recursive grammar rule.

14. The non-transitory computer readable medium of claim 11, wherein the search engine is an Elasticsearch search engine.

15. The non-transitory computer readable medium of claim 11, wherein the family search operator is a unary postfix operator.

* * * * *